(12) United States Patent
Nagai et al.

(10) Patent No.: US 12,065,557 B2
(45) Date of Patent: Aug. 20, 2024

(54) LIQUID-REPELLENT LAYER FORMING RESIN COMPOSITION, AND LIQUID-REPELLENT FILM, LIQUID-REPELLENT LAMINATE, PACKAGING MATERIAL, AND CONTAINER USING SAME

(71) Applicant: TOPPAN PRINTING CO., LTD., Tokyo (JP)

(72) Inventors: Aki Nagai, Tokyo (JP); Ryo Tanaka, Tokyo (JP); Kentaro Kimura, Tokyo (JP); Kosuke Kinoshita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 771 days.

(21) Appl. No.: 16/973,679

(22) PCT Filed: Jun. 7, 2019

(86) PCT No.: PCT/JP2019/022824
§ 371 (c)(1),
(2) Date: Dec. 9, 2020

(87) PCT Pub. No.: WO2019/240056
PCT Pub. Date: Dec. 19, 2019

(65) Prior Publication Data
US 2021/0115231 A1 Apr. 22, 2021

(30) Foreign Application Priority Data

Jun. 14, 2018 (JP) ................................. 2018-113861

(51) Int. Cl.
*C08L 23/06* (2006.01)
*B32B 7/12* (2006.01)
(Continued)

(52) U.S. Cl.
CPC ................ *C08L 23/06* (2013.01); *B32B 7/12* (2013.01); *B32B 27/08* (2013.01); *B32B 27/32* (2013.01);
(Continued)

(58) Field of Classification Search
CPC ......... B32B 7/12; B32B 7/2708; B32B 27/23; B32B 27/36; B65D 65/40; C08L 23/06; C08L 23/26; C08L 83/04
(Continued)

(56) References Cited

U.S. PATENT DOCUMENTS 6,114,443 A 9/2000 Lohse et al.
2012/0184676 A1 7/2012 Gahleitner et al.

FOREIGN PATENT DOCUMENTS

CN 101815754 A 8/2010
JP H8-337267 A 12/1996
(Continued)

OTHER PUBLICATIONS

Extended European Search Report dated Feb. 3, 2022 in related European Patent Application No. 198206070 (7 pages).
(Continued)

*Primary Examiner* — J. Gregory Pickett
*Assistant Examiner* — Niki M Eloshway
(74) *Attorney, Agent, or Firm* — STAAS & HALSEY LLP

(57) ABSTRACT

A liquid-repellent layer forming resin composition comprises a polyolefin resin (A), a silylated polyolefin (B), and a compatibilizer (C) having a site compatible with the polyolefin resin (A) and a site compatible with the silylated polyolefin (B), wherein a polyolefin site of the silylated polyolefin (B) is incompatible with the polyolefin resin (A).

10 Claims, 4 Drawing Sheets

(51) Int. Cl.
*B32B 27/08* (2006.01)
*B32B 27/32* (2006.01)
*B32B 27/36* (2006.01)
*B65D 65/40* (2006.01)
*C08L 23/26* (2006.01)
*C08L 83/04* (2006.01)

(52) U.S. Cl.
CPC .............. *B32B 27/36* (2013.01); *B65D 65/40* (2013.01); *C08L 23/26* (2013.01); *C08L 83/04* (2013.01); *B32B 2307/73* (2013.01); *B32B 2553/00* (2013.01)

(58) Field of Classification Search
USPC ...................................................... 220/62.22
See application file for complete search history.

(56) References Cited

FOREIGN PATENT DOCUMENTS

| | | | |
|---|---|---|---|
| JP | 2013-023224 A | | 2/2013 |
| JP | 2013-542285 A | | 11/2013 |
| JP | 2014-177541 A | | 9/2014 |
| JP | 2014-200949 A | | 10/2014 |
| JP | 2014-223752 A | | 12/2014 |
| JP | 2015-024548 A | | 2/2015 |
| JP | 2015-025051 A | | 2/2015 |
| JP | 2015025051 A | * | 2/2015 |
| JP | 2017-039816 | | 2/2017 |
| JP | 2017030218 A | * | 2/2017 |
| JP | 2017-179344 A | | 10/2017 |
| JP | 2018095799 A | * | 6/2018 |
| JP | 2018123174 A | * | 8/2018 |
| WO | WO 2012/044732 A1 | | 4/2012 |

OTHER PUBLICATIONS

Office Action mailed Aug. 3, 2022 in counterpart Chinese Patent Application No. 201980028798.1 (10 pages).
Ide, Fumio, "Practical polymer alloy design", Kogyo Chosakai Publishing Co., Ltd., 1996, p. 40-p. 42; (4 pages) (2 pages English Translation).
International Search Report (Form PCT/ISA/210); mailed on Sep. 3, 2019 in corresponding International Patent Application No. PCT/JP2019/022824) (4 pages) (4 pages English Translation).
Written Opinion of the International Searching Authority (Form PCT/ISA/237); mailed Sep. 3, 2019 in corresponding International PatentApplication No. PCT/JP2019/022824) (11 pages).
Notification of Transmittal of Translation of the International Preliminary Report on Patentability and International Preliminary Report on Patentability (Forms PCT/IB/330 and PCT/IB/373); issued Dec. 24, 2020 in corresponding International Patent Application No. PCT/J P2019/022824) (2 pages).
Korean Office Action issued in counterpart Korean Application No. 10-2020-7028227 dated Feb. 19, 2024.

* cited by examiner

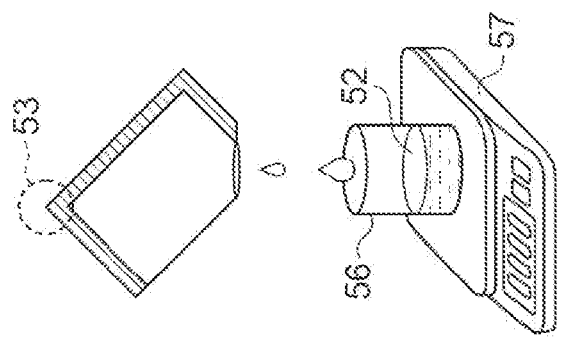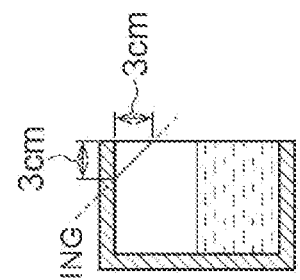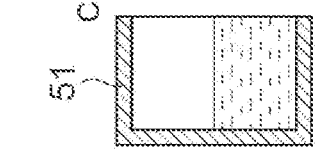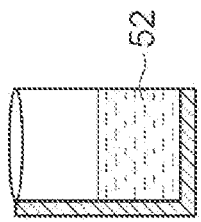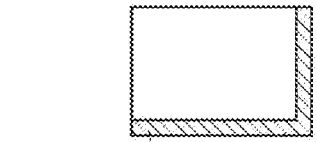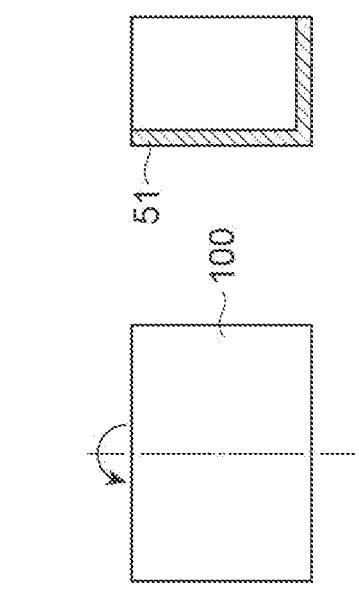

LIQUID-REPELLENT LAYER FORMING RESIN COMPOSITION, AND LIQUID-REPELLENT FILM, LIQUID-REPELLENT LAMINATE, PACKAGING MATERIAL, AND CONTAINER USING SAME

CROSS-REFERENCE TO RELATED APPLICATIONS

This application is a U.S. National Stage Application which claims the benefit under 35 U.S.C. § 371 of International Patent Application No. PCT/JP2019/022824 filed on Jun. 7, 2019, which claims foreign priority benefit under 35 U.S.C. § 119 of Japanese Patent Application No. 2018- filed on Jun. 14, 2018 in the Japanese Patent Office, the contents of both of which are incorporated herein by reference.

TECHNICAL FIELD

The present disclosure relates to a liquid-repellent layer forming resin composition, and a liquid-repellent film, a liquid-repellent laminate, a packaging material, and a container using the same.

BACKGROUND ART

Conventionally, packaging materials corresponding to the contents of various products such as foods, beverages, pharmaceuticals, and chemicals have been developed. In particular, plastic materials excellent in water resistance, oil resistance, gas barrier properties, light weight, flexibility, design, etc., are used as packaging materials for contents such as liquids, semi-solids, and gel substances.

Also, as a packaging material for contents such as liquids, semi-solids and gel substances, a plastic laminate of multiple types of plastic base materials, a composite laminate of paper, metal foil, inorganic material or the like and a plastic base material, a composite of plastic base material treated with a functional composition, etc., have been proposed to provide higher functionality.

As one of the above-mentioned high functions, for example, a function of preventing the adhesion of contents such as a liquid, a semi-solid, or a gel substance to the inner surface of the packaging material, i.e., preventing the contents from remaining inside the packaging material, is required. More specifically, container lid materials for yogurt, jelly, and syrup, retort food packaging materials for porridge, soup, curry, and pasta sauce, and film materials for storage containers of liquids, semi-solids, gel substances of chemicals and pharmaceuticals, are required to have high liquid repellency capable of preventing the contents from adhering to the inner surface and ending up as waste without full use, preventing stains due to adhesion of the contents, and eliminating time-consuming discharging of the contents.

Responding to these requirements, for example, in Patent Literature 1, a water-repellent packaging material with an inner surface having a silicone resin composition layer containing hydrophobic fine particles such as silicone particles is proposed. Further, in Patent Literature 2, a packaging material having water repellency against contents and mold releasability, with a resin layer including spherical silicon as the innermost layer, is proposed.

CITATION LIST

Patent Literature

Patent Literature 1: Japanese Unexamined Patent Publication No. 2013-23224
Patent Literature 2: Japanese Unexamined Patent Publication No. H8-337267

SUMMARY OF INVENTION

Technical Problem

As a material for the resin layer of the inner surface of packaging materials, a polyolefin resin such as polyethylene and polypropylene is used to impart functions such as heat sealability, heat resistance, and impact resistance. Even a polyolefin resin adding the above silicone particles to impart liquid repellency, however, easily causes aggregation of the silicone particles in the resin layer and separation of the silicone particles from the resin layer, having insufficient effect to prevent the adhesion of contents to the inner surface of the packaging material.

In view of the above conventional art having the problems, it is an object of the present disclosure to provide a resin composition from which a liquid-repellent layer capable of sufficiently preventing adhesion of the contents can be formed, and a liquid-repellent film, a liquid-repellent laminate, a packaging material, and a container using the same.

Solution to Problem

In order to achieve the objects, the present disclosure provides a liquid-repellent layer forming resin composition comprising a polyolefin resin (A), a silylated polyolefin (B), and a compatibilizer (C) having a site compatible with the polyolefin resin (A) and a site compatible with the silylated polyolefin (B), wherein a polyolefin site of the silylated polyolefin (B) is incompatible with the above polyolefin resin (A).

According to the above liquid-repellent layer forming resin composition, by the combination use of the polyolefin resin (A), the silylated polyolefin (B) having a polyolefin site incompatible with the polyolefin resin (A), and the compatibilizer (C), a liquid-repellent layer capable of sufficiently preventing the adhesion of contents can be formed. Although the silylated polyolefin (B) is a component for imparting liquid repellency to a liquid-repellent layer, in the case of addition of the silylated polyolefin (B) having a polyolefin site incompatible with the polyolefin resin (A) only to the polyolefin resin (A), silylated polyolefin (B) clumps to each other in the liquid-repellent layer to be formed, resulting in poor dispersibility, being unlikely to be localized on the surface of the liquid-repellent layer, so that sufficient liquid repellency is unlikely to be obtained. In contrast, by use of the compatibilizer (C) in combination with the silylated polyolefin (B), the dispersibility of silylated polyolefin (B) is improved and the polyolefin site of silylated polyolefin (B) is compatibilized with polyolefin resin (A) through the compatibilizer (C), so that the silicone site of the silylated polyolefin (B) is easily localized on the surface of the liquid-repellent layer, efficiently imparting liquid repellency to the liquid-repellent layer. Thereby, the liquid-repellent layer having liquid repellency superior to those using the conventional silicone particles can be formed.

In the above liquid-repellent layer forming resin composition, the above compatibilizer (C) may comprise at least one selected from the group consisting of a block copolymer of propylene and ethylene and a block copolymer of ethylene and an ethylene-butylene copolymer. Use of these compatibilizers (C) enables to use, for example, polypropylene for one of the polyolefin resin (A) and the polyolefin site of the silylated polyolefin (B), and polyethylene for another. Thereby, it becomes easy to impart functions such as heat sealability, heat resistance and impact resistance to a liquid-repellent layer, or to impart adequacy for use as packaging materials, such as packaging materials for retort foods, subjected to heat treatment such as warming in hot water. Further, in the case of using polypropylene for one of the polyolefin resin (A) and the polyolefin site of the silylated polyolefin (B), and polyethylene for another, use of the above compatibilizer (C) enables to more efficiently impart the liquid repellency to a liquid-repellent layer.

In the above liquid-repellent layer forming resin composition, the mass ratio of the content of the above compatibilizer (C) to the content of the above silylated polyolefin (B), (Mass of compatibilizer (C)/Mass of silylated polyolefin (B)), may be 0.05 to 20. With a content ratio within the above range, the liquid-repellent layer to be formed enables to prevent the adhesion of the contents more sufficiently.

The present disclosure also provides a liquid-repellent layer forming resin composition comprising a polyolefin resin (A) and a silylated polyolefin (B), wherein a polyolefin site of the above silylated polyolefin (B) is compatible with the above polyolefin resin (A).

According to the above liquid-repellent layer forming resin composition, by use of the polyolefin resin (A) in combination with a silylated polyolefin (B) having a polyolefin site compatible with the polyolefin resin (A), the dispersibility of silylated polyolefin (B) is improved in the liquid-repellent layer to be formed and the polyolefin site of silylated polyolefin (B) is compatibilized with polyolefin resin (A), so that the silicone site of the silylated polyolefin (B) is easily localized on the surface of the liquid-repellent layer, efficiently imparting liquid repellency to the liquid-repellent layer and sufficiently preventing the adhesion of the contents to the liquid-repellent layer.

The above liquid-repellent layer forming resin composition may further comprise a silicone (D). By further comprising a silicone (D), the amount of Si present in the surface of the liquid-repellent layer to be formed can be increased, and thereby liquid repellency can be further improved.

The present disclosure also provides a liquid-repellent film having a liquid-repellent layer formed by using the liquid-repellent layer forming resin composition of the above present disclosure. The liquid-repellent film has the liquid-repellent layer formed by using the liquid-repellent layer forming resin composition of the above present disclosure, so that the adhesion of the contents to the liquid-repellent layer can be sufficiently prevented. Further, the above liquid-repellent film exhibits excellent liquid repellency against not only water and oil, but also against oil dispersed in water-type contents such as curry and pasta sauce.

The above liquid-repellent film may further comprise one or more resin layers disposed on one main surface of the above liquid-repellent layer. The multi-layered structure of the liquid-repellent film having a resin layer other than the liquid-repellent layer enables to impart further functionalities (heat resistance, impact resistance, etc.) in addition to liquid repellency. Further, the liquid-repellent layer can be thinned with cost reduced.

In the case where the liquid-repellent film comprises a resin layer other than the liquid-repellent layer, the melting point $T1$ (° C.) of the above polyolefin resin (A) in the above liquid-repellent layer and the melting point $T2$ (° C.) of the resin contained in a resin layer in contact with the above liquid-repellent layer among the above one or more resin layers may satisfy a relation: $T1<T2$. The satisfaction of the above relation enables to suppress the migration of the silylated polyolefin (B) in the liquid-repellent layer to the second resin layer from the viewpoint of the crystallinity so as to localize the silylated polyolefin (B) on the surface of the liquid-repellent layer or to improve the bleed-out efficiency, so that the liquid-repellency tends to be further improved.

The present disclosure also provides a liquid-repellent laminate comprising a base material and the liquid-repellent film of the above present disclosure disposed on the base material, wherein the above liquid-repellent layer is disposed on at least one outermost surface. The liquid-repellent laminate comprises the liquid-repellent film of the above present disclosure, so that the adhesion of the contents to the liquid-repellent layer can be sufficiently prevented. Further, lamination of the liquid-repellent film on a base material having a desired function enables to impart mechanical strength and functions such as barrier properties and light-shielding properties to the liquid-repellent laminate.

The present disclosure also provides a packaging material formed by using the liquid-repellent laminate of the above present disclosure. The packaging material is formed by using the liquid-repellent laminate of the above present disclosure, so that the adhesion of the contents to the liquid-repellent layer can be sufficiently prevented.

The above packaging material may be one for use involving being subjected to heat treatment at 80° C. or more. According to the packaging material of the present embodiment, even in such a use, the adhesion of the contents to the inner surface of the packaging material can be prevented after heat treatment.

The present disclosure further provides a container having a liquid-repellent layer formed by using the resin composition of the above present disclosure at least on the inner surface. The container comprises the liquid-repellent layer formed by using the liquid-repellent layer forming resin composition of the above present disclosure, so that the adhesion of the contents to the liquid-repellent layer can be sufficiently prevented.

Advantageous Effects of Invention

According to the present disclosure, a resin composition from which a liquid-repellent layer capable of sufficiently preventing adhesion of the contents can be formed, and a liquid-repellent film, a liquid-repellent laminate, a packaging material, and a container using the same can be provided.

BRIEF DESCRIPTION OF DRAWINGS

FIGS. 3A to 3F is a schematic view illustrating the evaluation method of liquid repellency of a liquid-repellent laminate.

DESCRIPTION OF EMBODIMENTS

Figure 1:
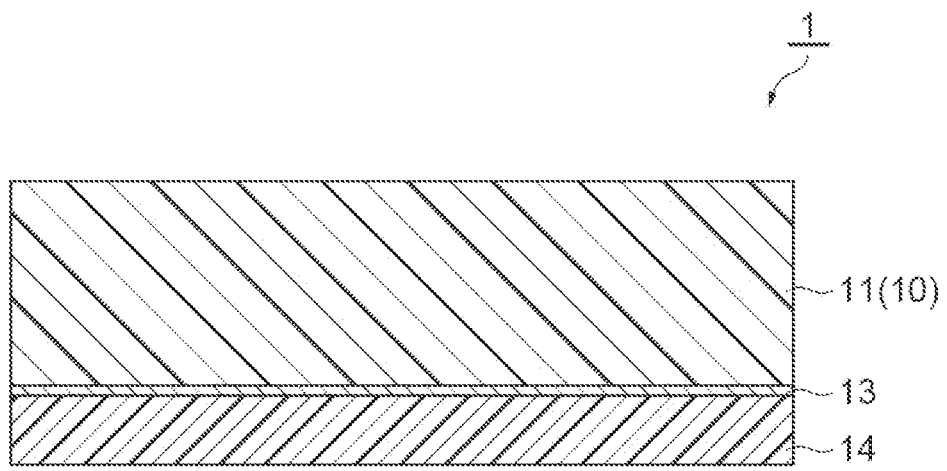
FIG. 1 is a schematic cross-sectional view showing a liquid-repellent laminate in an embodiment of the present disclosure.

The preferred embodiment of the present disclosure is described in detail with reference to drawings as follows.

Incidentally, the same symbol is added to the same or equivalent part in the drawing, and redundant explanation is omitted. The dimensional ratio in the drawing is not limited to the proportion shown in the drawing.

[Liquid-Repellent Laminate]

Figure 2:
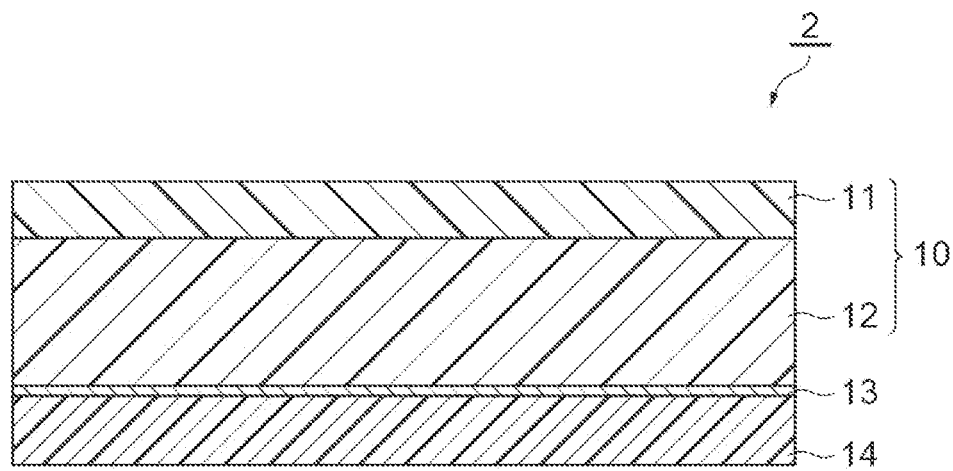
FIG. 2 is a schematic cross-sectional view showing a liquid-repellent laminate in an embodiment of the present disclosure.

The liquid-repellent laminate of the present embodiment comprises a base material and a liquid-repellent film disposed on the base material, and has a structure in which a liquid-repellent layer is disposed on at least one outermost surface. FIG. 1 and FIG. 2 are schematic cross-sectional views showing a liquid-repellent laminate of the present embodiment. The liquid-repellent laminate of the present embodiment may have a structure with a liquid-repellent film 10 consisting of a liquid-repellent layer 11 laminated with a base material 14 through an adhesive as with a liquid-repellent laminate 1 shown in FIG. 1.

Alternatively, the liquid-repellent laminate of the present embodiment may have a structure with a liquid-repellent film 10 consisting of a liquid-repellent layer 11 and a second resin layer 12 laminated with a base material 14 through an adhesive 13 as with a liquid-repellent laminate 2 shown in FIG. 2. In the case where the liquid-repellent film 10 comprises the second resin layer 12, the second resin layer 12 is disposed to oppose the base material 14, such that the liquid-repellent layer 11 of the liquid-repellent film 10 is located at the outermost surface of the liquid-repellent laminate 2.

<Liquid-Repellent Layer 11>

The liquid-repellent layer 11 is a layer having liquid repellency. The liquid-repellent layer 11 may be a layer that can exhibit heat sealability by heating. In the present specification, the liquid repellency is a concept including both characteristics of water repellency and oil repellency, and specifically, being characteristics of repelling water-based or oil-based materials in a liquid state, semi-solid state or gel state. Examples of the water-based or oil-based materials include foods such as water, oil, yogurt, jelly, pudding, syrup, rice porridge, soup, curry, and pasta sauce, detergents such as hand soap and shampoo, pharmaceuticals, cosmetics and chemicals. The heat sealability refers to characteristics enabling heat sealing, for example, under conditions at 100 to 200° C., under 0.1 to 0.3 MPa, for 1 to 3 seconds. The conditions for heat sealing can be easily changed depending on the conditions required for heat sealing of a liquid-repellent laminate.

The thickness of the liquid-repellent layer 11 is preferably 0.1 to 100 μm, more preferably 1 to 70 μm, still more preferably 3 to 50 μm, particularly preferably 5 to 30 μm. With a thickness of the liquid-repellent layer 11 equal to or more than the above lower limit, excellent liquid repellency and heat sealability tend to be easily obtained. On the other hand, with a thickness equal to or less than the above upper limit, the total thickness of the liquid-repellent layer can be thinned.

The liquid-repellent layer 11 can be formed by using a liquid-repellent layer forming resin composition comprising the following components. The liquid-repellent layer forming resin composition is described as follows.

<Liquid-Repellent Layer Forming Resin Composition>

The liquid-repellent layer forming resin composition in an embodiment of the present disclosure comprises a polyolefin resin (A) (hereinafter, also referred to as "component (A)"), a silylated polyolefin (B) (hereinafter, also referred to as "component (B)"), and a compatibilizer (C) having a site compatible with the above polyolefin resin (A) and a site compatible with the above silylated polyolefin (B) (hereinafter, also referred to as "component (C)"), wherein the polyolefin site of the above silylated polyolefin (B) is incompatible with the above polyolefin resin (A).

The liquid-repellent layer forming resin composition in another embodiment of the present disclosure comprises a polyolefin resin (A) and a silylated polyolefin (B), wherein a polyolefin site of the above silylated polyolefin (B) is compatible with the above polyolefin resin (A).

In other words, the liquid-repellent layer forming resin composition comprises the compatibilizer (C) as an essential component in the case where the polyolefin site of the silylated polyolefin (B) is incompatible with the polyolefin resin (A), while the compatibilizer (C) is not required in the case where the polyolefin site of the silylated polyolefin (B) is compatible with the polyolefin resin (A). Alternatively, the liquid-repellent layer forming resin composition may further comprise a silicone (D). Each of the components is described in detail as follows.

(Polyolefin Resin (A))

The polyolefin resin is not particularly limited, and examples thereof include a low density polyethylene, a medium density polyethylene, a high density polyethylene, an ethylene-α-olefin copolymer, a homo, block or random polypropylene, and a propylene-α-olefin copolymer. Examples of the α-olefin component include ethylene, 1-butene, 1-pentene, 1-hexene, 1-heptene, 1-octene, and 4-methyl-1-pentene. The copolymer may be a random copolymer or a block copolymer. In addition to the above, the polyolefin resin may be a cyclic polyolefin such as polynorbornene. It is preferable that the above polyolefin resin be a linear polyolefin from the viewpoint of sealability and strength properties (tensile strength, impact strength, etc.), and the linear polyolefin may be in a linear form or a branched form.

In the case of using the liquid-repellent laminate for packaging materials such as packaging materials for retort foods, subjected to heat treatment such as warming in hot water, it is preferable that the polyolefin resin comprise a polypropylene resin. The polyolefin resin comprising a polypropylene resin easily prevents a bag-shaped packaging material from bursting during heat treatment such as warming in hot water.

Examples of the polypropylene resin include homo polypropylene, block polypropylene, random polypropylene, and a copolymer of an α-olefin other than ethylene and propylene as described above and propylene (propylene-based copolymer). The block polypropylene in the present specification is different from an ethylene-propylene block copolymer which is a compatibilizer (C) described later, and generally has a structure with EPR (rubber component) and polyethylene dispersed in a homo polypropylene at the polymerization stage. Among them, it is preferable that the polypropylene resin comprise a random polypropylene or a block polypropylene. By comprising a random polypropylene, the heat sealing tends to be easily performed at a low temperature in a short time. By comprising a block polypropylene, the heat resistance and impact resistance are improved, so that the burst of a bag-shaped packaging material due to heat tends to be easily prevented.

The melting point of the polyolefin resin may be appropriately adjusted depending on the end use. For example, it is preferable that the melting point of the polyolefin resin for use as a packaging material for retort foods be 130 to 170° C.

The polyolefin resin may be a modified polyolefin modified with a predetermined acid. The modified polyolefin is obtained by graft-modifying a polyolefin with an unsaturated carboxylic acid derivative component derived from, for example, an unsaturated carboxylic acid, an unsaturated carboxylic acid anhydride, and an ester of an unsaturated carboxylic acid. Alternatively, modified polyolefins such as a hydroxyl group-modified polyolefin and an acrylic-modified polyolefin also may be used as the polyolefin resin.

One of the polyolefin resins described above may be used alone, or two or more thereof may be used in combination.

(Silylated Polyolefin (B))

The silylated polyolefin is a component to impart liquid repellency to the liquid-repellent layer 11. The silylated polyolefin includes a polyolefin unit having a silicone site.

Examples of the silylated polyolefin include a product manufactured by Dow Corning Toray Co., Ltd., as a PE-Si graft copolymer, Exfola manufactured by Mitsui Fine Chemicals, Inc., as a PE-Si block copolymer, and a product manufactured by Dow Corning Toray Co., Ltd., as a PP-Si graft copolymer.

As the silylated polyolefin, a block copolymer is more preferred than a graft copolymer from the viewpoint of further improving the liquid repellency of the liquid-repellent layer 11. The reason is that a block copolymer tends to be more easily localized or bleed out on the surface of the liquid-repellent layer 11.

One of the silylated polyolefins described above may be used alone, or two or more thereof may be used in combination.

The silylated polyolefin may have a polyolefin site compatible or not compatible (incompatible) with the polyolefin resin (A). In the case of using a silylated polyolefin having a polyolefin site incompatible with the polyolefin resin (A), however, use in combination with the following compatibilizer (C) is essential. In the case of using a silylated polyolefin having a polyolefin site incompatible with the polyolefin resin (A), although use in combination with the compatibilizer (C) is required, combination options for materials of the polyolefin resin (A) and the silylated polyolefin (B) increase, so that there exist advantages that design corresponding to a purpose and use is possible and liquid-repellency tends to be further improved.

(Compatibilizer (C))

A compatibilizer is used in the case where a silylated polyolefin having a polyolefin site incompatible with the polyolefin resin (A) is used as the silylated polyolefin (B). A compatibilizer is a component having a site compatible with the polyolefin resin (A) and a site compatible with the above silylated polyolefin (B). Use of the compatibilizer enables to improve the compatibility between the silylated polyolefin (B) having a polyolefin site incompatible with the polyolefin resin (A) and the polyolefin resin (A).

Examples of the site compatible with the polyolefin resin (A) include a polyolefin structure compatible with the polyolefin resin (A), preferably being a site having the same type of polyolefin structure as the polyolefin resin (A). In other words, in the case where the polyolefin resin (A) is a polyethylene resin, it is preferable that the compatibilizer (C) has a polyethylene structure, while in the case where the polyolefin resin (A) is a polypropylene resin, it is preferable that the compatibilizer (C) has a polypropylene structure. Also, in the case where the polyolefin resin (A) is a copolymer consisting of two or more types of olefins such as an ethylene-α-olefin copolymer and a propylene-α-olefin copolymer, it is preferable that the compatibilizer (C) has at least a structure in which the same type of olefin as the main component olefin among olefins to constitute the above copolymer is polymerized or copolymerized.

Examples of the site compatible with the silylated polyolefin (B) include a polyolefin structure compatible with the polyolefin site of the silylated polyolefin (B), and a site having the same type of polyolefin structure as the polyolefin site of the silylated polyolefin (B) is preferred. In other words, in the case where the polyolefin site of the silylated polyolefin (B) has a polyethylene structure, it is preferable that the compatibilizer (C) has a polyethylene structure, while in the case where the polyolefin site of the silylated polyolefin (B) has a polypropylene structure, it is preferable that the compatibilizer (C) has a polypropylene structure. Also, in the case where the polyolefin site of the silylated polyolefin (B) has a structure based on a copolymer consisting of two or more types of olefins such as an ethylene-α-olefin copolymer and a propylene-α-olefin copolymer, it is preferable that the compatibilizer (C) has at least a structure in which the same type of olefin as the main component olefin among olefins to constitute the above copolymer is polymerized or copolymerized.

As the compatibilizer (C), for example, a block copolymer constituting a polyethylene unit composed of a polyethylene or an ethylene-α-olefin copolymer and a polypropylene unit composed of a polypropylene or a propylene-α-olefin copolymer, or a block copolymer constituting a polyethylene unit and an ethylene-butylene copolymer unit may be used. Such a block copolymer may have any one of the structures of a diblock copolymer, a triblock copolymer, and a multiblock copolymer. In this instance, in the case where the polyolefin site of the polyolefin resin (A) or the silylated polyolefin (B) is a polyethylene, the site and the polyethylene site (polyethylene unit) of the compatibilizer (C) are compatible with each other, and in the case where the polyolefin site of the polyolefin resin (A) or the silylated polyolefin (B) is a polypropylene, the site and the polypropylene site (polypropylene unit) or the ethylene-butylene copolymer site (ethylene-butylene copolymer unit) of the compatibilizer (C) are compatible with each other.

One type of the above compatibilizers may be used alone, or two or more types thereof may be used in combination.

(Silicone (D))

Silicone is a component to further improve the liquid repellency of the liquid-repellent layer 11. Examples of the silicone include a silicone oil, a silicone resin, a silicone oligomer, and a silicone powder. Among them, a silicone oil is preferred since more excellent liquid repellency tends to be easily obtained.

Examples of the silicone oil include a dimethyl silicone oil, a methylphenyl silicone oil, a methyl hydrogen silicone oil, a cyclic dimethyl silicone oil, an alkyl-modified silicone oil, a long-chain alkyl-modified silicone oil, and a higher fatty acid-modified silicone oil.

Examples of the silicone oil include products manufactured by Asahi Kasei Wacker Silicone Co., Ltd., products manufactured by Shin-Etsu Chemical Co., Ltd., products manufactured by Momentive Performance Materials, Inc., and products manufactured by Dow Corning Toray Co., Ltd.

Examples of the silicone resin include products manufactured by Shin-Etsu Chemical Co., Ltd., and products manufactured by Asahi Kasei Wacker Silicone Co., Ltd.

Examples of the silicone oligomer include products manufactured by Shin-Etsu Chemical Co., Ltd., and products manufactured by Dow Corning Toray Co., Ltd.

Examples of the silicone powder include products manufactured by Shin-Etsu Chemical Co., Ltd., and products manufactured by Dow Corning Toray Co., Ltd.

One of the silicones described above may be used alone, or two or more thereof may be used in combination.

The content of the component (A) in the liquid-repellent layer forming resin composition is preferably 50.0 to 99.9 mass %, more preferably 55.0 to 99.0 mass %, still more preferably 60.0 to 98.0 mass %, relative to the total solid content of the liquid-repellent layer forming resin composition. With a content of the component (A) equal to or more than the above lower limit, excellent heat sealability tends to be easily obtained. On the other hand, with a content of the component (A) equal to or less than the above upper limit, the content of the component (B) and the component (C) increases relatively, so that the liquid repellency tends to be easily increased.

The total content of the component (B) and the component (C) in the liquid-repellent layer forming resin composition is preferably 0.1 to 50.0 mass %, more preferably 1.0 to 45.0 mass %, still more preferably 2.0 to 40.0 mass %, relative to the total solid content of the liquid-repellent layer forming resin composition. With a total content of the component (B) and the component (C) equal to or more than the above lower limit, liquid repellency tends to be easily improved. On the other hand, with a total content of the component (B) and the component (C) equal to or less than the above upper limit, the content of the component (A) increases relatively, so that the excellent heat sealability tends to be easily obtained.

In the case where the liquid-repellent layer forming resin composition comprises the component (C), the mass ratio of the content of the component (C) to the content of the component (B), (Mass of component (C)/Mass of component (B)), may be 0.01 to 50, preferably 0.05 to 30, more preferably 0.05 to 20. With a content ratio equal to or more than the above lower limit, the silylated polyolefin (B) is sufficiently dispersed in the liquid-repellent layer, so that more excellent liquid repellency tends to be obtainable. On the other hand, with a content ratio equal to or less than the above upper limit, the silylated polyolefin (B) is prevented from being covered with the excessive compatibilizer (C), so that more excellent liquid-repellency tends to be obtainable. Also, even with addition of the compatibilizer (C) with a content ratio of more than the above upper limit, the silylated polyolefin (B) is not further dispersed, so that the effect to improve the liquid repellency tends to disappear.

In the case where the liquid-repellent layer forming resin composition comprises the component (D), the content is preferably 0.1 to 20.0 mass %, more preferably 1.0 to 15.0 mass %, still more preferably 2.0 to 10.0 mass %, relative to the total amount of the liquid-repellent layer forming resin composition. With a content of the component (D) equal to or more than the above lower limit, the liquid repellency tends to be easily improved. On the other hand, with a content of the component (D) equal to or less than the above upper limit, the content of the component (A) increases relatively, so that excellent heat sealability tends to be easily obtained. Also, with a content of the component (D) of more than the above upper limit, separation of the component (D) from the liquid-repellent layer tends to easily occur.

The liquid-repellent layer forming resin composition may comprise other additives on an as needed basis, within a range not to impair the liquid repellency. Examples of the other additives include flame retardants, slip agents, antiblocking agents, antioxidants, light stabilizers, and tackifiers.

The liquid-repellent layer 11 may be formed by forming a film of the liquid-repellent layer forming resin composition.

<Second Resin Layer 12>

The second resin layer 12 is a layer disposed between the liquid-repellent layer 11 and the base material 14, in order to improve the heat sealability, heat resistance, the impact resistance, oxygen/water vapor barrier properties, etc. It is preferable that the second resin layer 12 comprise a thermoplastic resin having heat sealability.

The thermoplastic resin used for the second resin layer 12 is not particularly limited, and examples thereof include a polyolefin resin, an ethylene-α,β-unsaturated carboxylic acid copolymer or an esterified product or an ionically cross-linked product thereof, an ethylene-vinyl acetate copolymer or a saponified product thereof, a polyvinyl acetate or saponified product thereof, a polycarbonate resin, a thermoplastic polyester resin, an ABS resin, a polyacetal resin, a polyamide resin, a polyphenylene oxide resin, a polyimide resin, a polyurethane resin, a polylactic acid resin, a furan resin, and a silicone resin. One of these thermoplastic resins may be used alone or two or more thereof may be used in combination.

It is preferable that the thermoplastic resin described above fur use in the second resin layer 12 comprise a polyolefin resin for easy improvement in heat sealability, heat resistance and impact resistance. As the polyolefin resin, one similar to the polyolefin resin (A) for use in the liquid-repellent layer 11 may be used.

In the case where the second resin layer 12 is in contact with the liquid-repellent layer 11, it is preferable that the melting point T1 (° C.) of the polyolefin resin (A) in the liquid-repellent layer 11 and the melting point T2 (° C.) of the above thermoplastic resin in the second resin layer 12 satisfy a relation: $T1<T2$. The satisfaction of the above relation enables to suppress the migration of the silylated polyolefin (B) in the liquid-repellent layer 11 to the second resin layer 12 from the viewpoint of the degree of crystallinity so as to localize the silylated polyolefin (B) on the surface of the liquid-repellent layer 11 or to improve the bleed-out efficiency, so that the liquid-repellency tends to be further improved. From the same viewpoint, the melting point T2 is higher than the melting point T1 preferably by 1° C. or more, more preferably by 3° C. or more.

The thickness of the second resin layer 12 may be appropriately set depending on the end use of a commercial product made from the liquid-repellent layer forming resin composition. For example, the thickness of the second resin layer 12 is preferably 0.1 to 300 μm, more preferably 1 to 200 μm, still more preferably 5 to 150 μm, particularly preferably 10 to 100 μm.

<Liquid-Repellent Film 10>

The liquid-repellent film 10 having liquid repellency is formed of a single layer of the liquid-repellent layer 11 or two layers of the liquid-repellent layer 11 and the second resin layer 12 described above. The liquid-repellent film 10 is formed to cover a part or the whole of the surface of the base material 14. Incidentally, the liquid-repellent film 10 may be used alone, without lamination to the base material 14 depending on use.

The liquid-repellent film 10 may further comprise one or more resin layers other than the liquid-repellent layer 11 and the second resin layer 12. The composition of the other resin layers may be the same as the composition of the second resin layer 12 or may be different therefrom.

<Base Material 14>

The base material 14 is not particularly limited as long as it can be used as a support, and examples thereof include paper, a resin film, and a metal foil. Examples of the paper include wood-free paper, wood-free specialty paper, coated paper, art paper, cast-coated paper, imitation vellum, and kraft paper. Examples of the resin film include a film comprising at least one of polyolefin (e.g. polyethylene (PE) and polypropylene (PP)), acid-modified polyolefin, polyester (e.g. polyethylene terephthalate (PET)), polyamide (PA), polyvinyl chloride (PVC), cellulose acetate, and cellophane resin. The film may be a stretched film or an unstretched film. Examples of the metal foil include an aluminum foil and a nickel foil. The base material 14 may be a laminate of a plurality of base materials made of different materials.

The thickness of the base material 14 may be appropriately adjusted depending on use without particular limitation, being usually 1 to 500 μm, preferably 10 to 100 μm.

Examples of the method for laminating the base material 14 with the liquid-repellent film 10 include a lamination method using an adhesive and a lamination method by heat treatment to be described below, though not limited thereto.

(Lamination Method Using Adhesive)

As the lamination method using an adhesive, various known lamination method such as dry laminating, wet laminating and non-solvent laminating may be used. Examples of the adhesive 13 for use in these lamination methods include the following.

<Adhesive 13>

The adhesive 13 bonds the liquid-repellent film 10 to the base material 14. Examples of the adhesive 13 include a polyurethane resin obtained by reacting a bifunctional or higher functional isocyanate compound with a main agent such as polyester polyol, polyether polyol, acrylic polyol, and carbonate polyol. One of the various polyols described above may be used alone, or two or more thereof may be used in combination.

To the adhesive 13 of the polyurethane resin described above, a carbodiimide compound, an oxazoline compound, an epoxy compound, a phosphorus compound, a silane coupling agent, or the like may be further added for the purpose of facilitating adhesion.

Alternatively, depending on the performance required for the adhesive 13, other various additives or stabilizers may be added to the polyurethane resin described above.

The thickness of the adhesive 13 is, for example, preferably 1 to 10 μm, more preferably 3 to 7 μm, from the viewpoint of obtaining a desired adhesion strength, followability, processability, etc., though not particularly limited thereto.

(Lamination Method by Heat Treatment)

Examples of the lamination method by heat treatment generally include the following methods.

(1) A method in which an adhesive resin is extruded between a liquid-repellent film 10 formed in advance and a base material 14 so as to be laminated.

(2) A method in which a resin layer including a liquid-repellent film 10 and an adhesive resin are coextruded so as to be laminated with a base material 14.

(3) A method in which the laminated base material obtained by the above method (1) or (2) is then bonded by heating and pressing with a hot roll.

(4) A method in which the laminated base material obtained by the above method (1) or (2) is then stored in a high temperature atmosphere or passed through a drying/baking furnace in a high temperature atmosphere.

Examples of the adhesive resin for use in the lamination method by heat treatment include an acid-modified polyolefin. Although the base material 14 and the liquid-repellent film 10 are laminated by extrusion lamination in the method described above, it is also possible to perform lamination by applying an acid-modified polyolefin-based coating agent (dissolving-type or dispersion type) onto the base material 14 in advance and then heat-treating the liquid-repellent film 10 without performing extrusion lamination.

It is also possible to dispose an adhesive primer (anchor coating) on the base material 14. As the material thereof, it is possible to use polyester, polyurethane, polyallylamine, polyethyleneimine, polybutadiene, an ethylene-vinyl acetate copolymer, chlorine-vinyl acetate, etc. To the adhesive primer, various curing agents and additives usable as the adhesive 13 may be added on an as needed basis.

[Packaging Material]

The packaging material in the present embodiment is formed by using the liquid-repellent laminate described above. Examples of the packaging material include container lid materials for yogurt, jelly, and syrup, retort food packaging materials (retort pouch) for porridge, soup, curry, and pasta sauce. The packaging material is formed such that the liquid-repellent layer is disposed inside the packaging material (contents side), so that the contents such as liquids, semi-solids, and gel materials are prevented from adhering to the inside of the packaging material or remaining thereon. Also, a bag-shaped packaging material such as a packaging material for retort foods causes blocking of the innermost layers of the packaging material with each other, so that the contents are unlikely to be discharged in some cases. However, the packaging material in the present embodiment is unlikely to cause blocking of the liquid-repelling layers as innermost layers with each other, so that it is possible to efficiently discharge the contents.

The above packaging material may be one for use involving being subjected to heat treatment at 80° C. or more. Specifically, the packaging material may be for use as packaging materials for retort foods, subjected to heat treatment such as warming in hot water. Even when the packaging material in the present embodiment is used for such a use, the contents are prevented from adhering to the inside of the packaging material or remaining thereon after heat treatment.

[Container]

The container in the present embodiment is a container having the liquid-repellent layer formed by using the liquid-repellent layer forming resin composition described above at least on the inner surface (contents side). Specific examples of the container include a storage container of liquids, semi-solids, gel materials of chemicals and pharmaceuticals and a bottle accommodating hand soap, shampoo, etc. The container is formed such that the liquid-repellent layer is disposed on the inner surface (contents side) of the container, so that the contents such as liquids, semi-solids and gel materials are prevented from adhering to the inside of the container or remaining thereon.

EXAMPLES

The present disclosure is described in more detail based on Examples and Comparative Examples as follows, though the present disclosure is not limited to Examples described below.

Example 1

<Preparation of Liquid-Repellent Layer Forming Resin Composition>

A linear low density polyethylene (LLDPE, trade name "Evolue", manufactured by Prime Polymer Co., Ltd.) as the component (A) and a silylated polyethylene (a graft copolymer of PE-Si, manufactured by Dow Corning Toray Co., Ltd.) as the component (B) were mixed to prepare a liquid-repellent layer forming resin composition. The content of each of the components was adjusted to 5 mass % of the component (B) with a balance of the component (A) based on the total amount of the component (A) and the component (B).

<Preparation of Liquid-Repellent Laminate>

Using a three-layer coextrusion machine, a liquid-repellent layer forming resin composition was extruded to form a liquid-repellent film consisting of a liquid-repellent layer having a thickness of 100 µm. The resulting liquid-repellent film and a PET film (trade name "Emblet", manufactured by Unitika Ltd.) having a thickness of 38 µm as base material were dry laminated using a polyurethane adhesive (manufactured by Mitsui Chemicals, Inc.), and aged at 50° C. for 5 days to obtain a liquid-repellent laminate.

Examples 2 to 10

A liquid-repellent layer forming resin composition, a liquid-repellent film and a liquid-repellent laminate were prepared in the same manner as in Example 1, except that the types of the component (A) and the component (B) in the liquid-repellent layer forming resin composition and the content of the component (B) (with a balance of the component (A)) were changed as shown in Table 1.

Example 11

<Preparation of Liquid-Repellent Layer Forming Resin Composition>

A linear low density polyethylene (LLDPE, trade name "Evolue", manufactured by Prime Polymer Co., Ltd.) as the component (A), a silylated polyethylene (a triblock copolymer of PE-Si-PE, trade name "Exfola" manufactured by Mitsui Fine Chemicals, Inc.) as the component (B), and a silicone oil (dimethyl silicone manufactured by Dow Corning Toray Co., Ltd.) as the component (D) were mixed to prepare a liquid-repellent layer forming resin composition. The content of each of the components was adjusted to 5 mass % of the component (B) and 5 mass % of the component (D) with a balance of the component (A) based on the total amount of the component (A), the component (B) and the component (D).

<Preparation of Liquid-Repellent Laminate>

A liquid-repellent film and a liquid-repellent laminate were prepared in the same manner as in Example 1, except that the liquid-repellent layer forming resin composition described above was used.

Examples 12 to 13

A liquid-repellent layer forming resin composition, a liquid-repellent film and a liquid-repellent laminate were prepared in the same manner as in Example 11, except that the types of the component (A) and the component (B) in the liquid-repellent layer forming resin composition were changed as shown in Table 1.

Example 14

<Preparation of Liquid-Repellent Layer Forming Resin Composition>

A liquid-repellent layer forming resin composition was prepared in the same manner as in Example 1.

<Preparation of Liquid-Repellent Laminate>

A linear low density polyethylene (LLDPE, trade name "Evolue", manufactured by Prime Polymer Co., Ltd.) as the component (A) was used as a second resin layer forming resin composition. Using a three-layer coextrusion machine, the liquid-repellent layer forming resin composition and the second resin layer forming resin composition were coextruded to form a liquid-repellent film consisting of a liquid-repellent layer having a thickness of 15 µm and a second resin layer having a thickness of 85 µm. The second resin layer of the resulting liquid-repellent film and a PET film (trade name "Emblet", manufactured by Unitika Ltd.) having a thickness of 38 µm as base material were dry laminated using a polyurethane adhesive (manufactured by Mitsui Chemicals, Inc.) to obtain a liquid-repellent laminate.

Example 15

A liquid-repellent layer forming resin composition, a second resin layer forming resin composition, a liquid-repellent film and a liquid-repellent laminate were prepared in the same manner as in Example 14, except that the type of the component (A) in the second resin layer forming resin composition was changed as shown in Table 1.

Example 16

<Preparation of Liquid-Repellent Layer Forming Resin Composition>

A random polypropylene (propylene-ethylene random copolymer, trade name "Prime Polypro", manufactured by Prime Polymer Co., Ltd.) as the component (A), a silylated polyethylene (triblock copolymer of PE-Si-PE, trade name "Exfola" manufactured by Mitsui Fine Chemicals, Inc.) as the component (B), and a block copolymer of PP-PE as the component (C) were mixed to prepare a liquid-repellent layer forming resin composition. The content of each of the components was adjusted to 5 mass % of the component (B) and 0.1 mass % of the component (C) with a balance of the component (A) based on the total amount of the component (A), the component (B) and the component (C).

<Preparation of Liquid-Repellent Laminate>

A liquid-repellent film and a liquid-repellent laminate were prepared in the same manner as in Example 14, except that the liquid-repellent layer forming resin composition described above was used and the type of the component (A) in the second resin layer forming resin composition was changed as shown in Table 1.

Examples 17 to 56

A liquid-repellent layer forming resin composition, a second resin layer forming resin composition, a liquid-repellent film and a liquid-repellent laminate were prepared in the same manner as in Example 16, except that the types of the component (A), the component (B) and the component (C), and the content of each of the component (B) and the component (C) (with a balance of the component (A)) in the liquid-repellent layer forming resin composition, and the type of the component (A) in the second resin layer forming resin composition were changed as shown in Table 1 and Table 2. Incidentally, in Example 25, the component (D) was further added to a liquid-repellent layer forming resin composition as shown in Table 1.

Comparative Example 1

A liquid-repellent layer forming resin composition, a second resin layer forming resin composition, a liquid-repellent film and a liquid-repellent laminate were prepared in the same manner as in Example 14, except that the component (B) was not added to the liquid-repellent layer forming resin composition.

Comparative Example 2

A liquid-repellent layer forming resin composition, a second resin layer forming resin composition, a liquid-repellent film and a liquid-repellent laminate were prepared in the same manner as in Comparative Example 1, except that the type of the component (A) in the liquid-repellent layer forming resin composition and the type of the component (A) in the second resin layer forming resin composition were changed as shown in Table 2.

Comparative Examples 3 to 4

A liquid-repellent layer forming resin composition, a second resin layer forming resin composition, a liquid-repellent film and a liquid-repellent laminate were prepared in the same manner as in Example 14, except that the types of the component (A) and the component (B) and the content of the component (B) (with a balance of the component (A)) in the liquid-repellent layer-forming resin composition and the type of the component (A) in the second resin layer forming resin composition were changed as shown in Table 2.

Comparative Example 5

A liquid-repellent layer forming resin composition, a second resin layer forming resin composition, a liquid-repellent film and a liquid-repellent laminate were prepared in the same manner as in Example 24, except that the component (B) was not added to the liquid-repellent layer forming resin composition.

In Table 1 and Table 2, the details of each of the components are as follows. In Table 1 and Table 2, "-" means that the corresponding component was not used. Also, in Table 1 and Table 2, the mass ratio of the content of the component (C) to the content of the component (B), (Mass of component (C)/Mass of component (B)), in the liquid-repellent layer is shown. Also, in Table 1 and Table 2, the magnitude relationship between the melting point T1 (° C.) of the resin as the component (A) used in the liquid-repellent layer and the melting point T2 (° C.) of the resin as the component (A) used in the second resin layer is shown. Further, in Table 1 and Table 2, the compatibility between the component (A) and the component (B) (polyolefin site) in the liquid-repellent layer is shown.

[Polyolefin Resin (A)]
A1: Linear low density polyethylene (LLDPE), trade name "Evolue", manufactured by Prime Polymer Co., Ltd., melting point: 116° C.
A2: Random polypropylene (propylene-ethylene random copolymer), trade name "Prime Polypro", manufactured by Prime Polymer Co., Ltd., melting point: 134° C.
A3: Block polypropylene, trade name "Novatec", manufactured by Japan Polypropylene Corporation, melting point: 165 to 166° C.
A4: Linear low density polyethylene (LLDPE), trade name "Novatec LL", manufactured by Japan Polyethylene Corporation, melting point: 122° C.
[Silylated Polyolefin (B)]
B1: Graft copolymer of PE-Si, manufactured by Dow Corning Toray Co., Ltd.
B2: Triblock copolymer of PE-Si-PE, trade name "Exfola", manufactured by Mitsui Fine Chemicals, Inc.
B3: Graft copolymer of PP-Si, manufactured by Dow Corning Toray Co., Ltd.
[Compatibilizer (C)]
C1: Block copolymer of propylene and ethylene
C2: Block copolymer of ethylene and ethylene-butylene copolymer
[Silicone (D)]
D1: Silicone oil (dimethyl silicone), manufactured by Dow Corning Toray Co., Ltd.
[Evaluation on Liquid Repellency]

Examples 1 to 6, 11, 14 to 15, 34 to 40, and Comparative Example 1: Liquid Repellency without Heat Treatment The liquid-repellent layer forming resin compositions with use of a linear low density polyethylene (LLDPE) as the component (A) in Examples 1 to 6, 11, 14 to 15, 34 to 40, and Comparative Example 1 were evaluated on the liquid repellency without heat treatment by a method shown in FIGS. 3A to 3F. First, a sample 100 obtained by cutting each of the liquid-repellent laminates obtained in Examples and Comparative Example into a length of 210 mm and a width of 300 mm was folded in half into a length of 210 mm and a width of 150 mm, such that the liquid-repellent layer was located inside (refer to FIG. 3A. One edge side in the longitudinal direction and one edge side in the width direction (side opposite to the folded side) of the folded sample 100 were heat sealed over a width of 10 mm with a heat sealer under conditions at 190° C. under 0.03 MPa for 2 seconds to form a seal part 51, so that a pouch with an edge side in the longitudinal direction open was prepared (refer to FIG. 3B). Subsequently, 100 g of a salad oil 52 (trade name: "Nisshin Salad Oil", manufactured by The Nisshin Oillio Group, Ltd.) was poured through the opening of the pouch (refer to FIG. 3C. The opening was then heat sealed over a width of 10 mm with a heat sealer under conditions at 190° C. under 0.03 MPa for 2 seconds to form a seal part 51, so that the pouch was hermetically sealed (refer to FIG. 3D. A triangle part having a length of 3 cm and a width of 3 cm excluding the seal part 51 was cut out from the corner including the side folded back of the hermetically sealed pouch, so that a spout was formed (refer to FIG. 3E. The corner 53 located diagonally to the spout was held for 30 seconds with the pouch turned upside down to discharge the salad oil 52 into a container 56, and the amount discharged (g) was weighed with a scale 57 (refer to FIG. 3F. From the measured amount discharged, the amount of residual liquid (%) was obtained by the following equation.

Amount of residual liquid (%)={(100−Amount discharged)/100}×100

The measurement was performed 3 times, and the liquid repellency was evaluated from the average amount of residual liquid of the 3 measurements based on the following evaluation criteria. The average amount of residual liquid (%) and the evaluation results on the liquid repellency are shown in Table 3 and Table 4.

⊚: The average amount of residual liquid is less than 2.0%.
○: The average amount of residual liquid is 2.0% or more and less than 2.5%.
Δ: The average amount of residual liquid is 2.5% or more and less than 3.5%.
x: The average amount of residual liquid is 3.5% or more.

Examples 7 to 10, 12 to 13, 16 to 33, 41 to 56, and Comparative Examples 2 to 5: Liquid Repellency after Warming in Hot Water and after Retort Treatment The liquid-repellent layer forming resin compositions with use of a random polypropylene (PP-PE random copolymer) or a block polypropylene as the component (A) in Examples 7 to 10, 12 to 13, 16 to 33, 41 to 56, and Comparative Examples 2 to 5 were evaluated on the liquid repellency after warming in hot water and after retort treatment by a method shown in FIGS. 4A to 4E. First, two sheets of samples 200 were prepared by cutting each of the liquid-repellent laminates obtained in Examples and Comparative Examples into a length of 210 mm and a width of 150 mm. The two sheets of the samples 200 were superimposed such that each of the liquid-repellent layers was located inside. One edge side in the longitudinal direction and both two edge sides in the width direction were heat sealed over a width of 10 mm with a heat sealer under conditions at 190° C. under 0.03 MPa for 2 seconds to form a seal part 51, so that a pouch with an edge side in the longitudinal direction open was prepared (refer to FIG. 4A. Subsequently, 100 g of an oil dispersed in water-type liquid 54 (trade name: "Bon Curry", manufactured by Otsuka Foods Co., Ltd.) was poured through the opening of the pouch (refer to FIG. 4B. The opening was then heat sealed over a width of 10 mm with a heat sealer under conditions at 190° C. under 0.03 MPa for 2 seconds to form a seal part 51, so that the pouch was hermetically sealed (refer to FIG. 4C.

In the case of warming in hot water, the hermetically sealed pouch was subjected to warming in hot water at 100° C. for 5 minutes. On the other hand, in the case of retort treatment, the hermetically sealed pouch placed in a high-temperature high-pressure cooking sterilizer (manufactured by Hitachi Capital Corporation) was subjected to retort treatment under conditions with a high-temperature steam at a pressure of 0.2 MPa, at 121° C. for 30 minutes, and further subjected to warming in hot water described above.

Figure 4E:
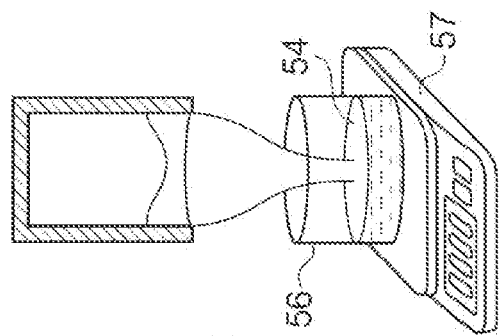
FIGS. 4A to 4E is a schematic view illustrating the evaluation method of liquid repellency of a liquid-repellent laminate.
Figure 4D:
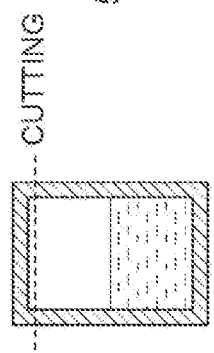
Figure 4C:
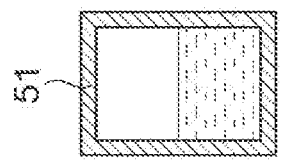
Figure 4B:
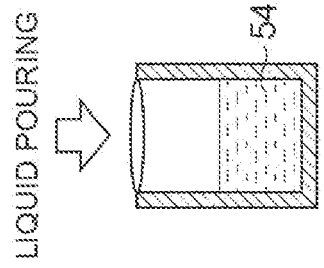
Figure 4A:
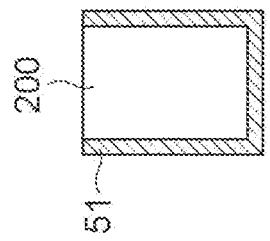

Immediately after the above treatment, the upper part of the hermetically sealed pouch was cut to form a spout (refer to FIG. 4D. Subsequently, the seal part 51 opposite to the spout was held for 30 seconds with the pouch turned upside down to discharge the oil dispersed in water-type liquid 54 into a container 56, and the amount discharged (g) was weighed with a scale 57 (refer to FIG. 4E. From the measured amount discharged, the amount of residual liquid (%) was obtained by the following equation.

Amount of residual liquid (%)={(100−Amount discharged)/100}×100

The measurement was performed 3 times, and the liquid repellency was evaluated from the average amount of residual liquid of the 3 measurements based on the following evaluation criteria. The average amount of residual liquid (%) and the evaluation results on the liquid repellency are shown in Table 3 and Table 4.

⊚: The average amount of residual liquid is less than 8.0%.

○: The average amount of residual liquid is 8.0% or more and less than 10.0%.

Δ: The average amount of residual liquid is 10.0% or more and less than 13.0%.

x: The average amount of residual liquid is 13.0% or more.

[Evaluation on Appearance]

In the above evaluation on the liquid repellency, when the liquid was discharged from inside the pouch, the discharge behavior of the liquid was visually observed to perform evaluation on appearance based on the following evaluation criteria. The results are shown in Table 3 and Table 4.

○: A state of repelling liquid is observed, and adhesion to the liquid-repellent laminate is scarce.

Δ: Although a state of repelling liquid is observed, adhesion to the liquid-repellent laminate is present.

x: A state of repelling liquid is not observed.

TABLE 1

| | Liquid-repellent layer | | | | Component content in liquid-repellent layer | | | | Comparison of melting point of resin | | Compatibility between component (A) and component (B) in liquid-repellent layer |
|---|---|---|---|---|---|---|---|---|---|---|---|
| | Component (A) | Component (B) | Component (C) | Component (D) | Component (B) [mass %] | Component (C) [mass %] | Mass ratio (C)/(B) | Component (D) [mass %] | Second resin layer | | |
| Example 1 | A1 | B1 | — | — | 5 | — | — | — | — | — | Compatible |
| Example 2 | A1 | B1 | — | — | 10 | — | — | — | — | — | Compatible |
| Example 3 | A1 | B1 | — | — | 15 | — | — | — | — | — | Compatible |
| Example 4 | A1 | B2 | — | — | 5 | — | — | — | — | — | Compatible |
| Example 5 | A1 | B2 | — | — | 10 | — | — | — | — | — | Compatible |
| Example 6 | A1 | B2 | — | — | 15 | — | — | — | — | — | Compatible |
| Example 7 | A2 | B3 | — | — | 5 | — | — | — | — | — | Compatible |
| Example 8 | A2 | B3 | — | — | 15 | — | — | — | — | — | Compatible |
| Example 9 | A3 | B3 | — | — | 5 | — | — | — | — | — | Compatible |
| Example 10 | A3 | B3 | — | — | 15 | — | — | — | — | — | Compatible |
| Example 11 | A1 | B2 | — | D1 | 5 | — | — | 5 | — | — | Compatible |
| Example 12 | A2 | B3 | — | D1 | 5 | — | — | 5 | — | — | Compatible |
| Example 13 | A3 | B3 | — | D1 | 5 | — | — | 5 | — | — | Compatible |
| Example 14 | A1 | B2 | — | — | 5 | — | — | — | A1 | T1 = T2 | Compatible |
| Example 15 | A1 | B2 | — | — | 5 | — | — | — | A4 | T1 < T2 | Compatible |
| Example 16 | A2 | B2 | C1 | — | 5 | 0.1 | 0.02 | — | A2 | T1 = T2 | Incompatible |
| Example 17 | A2 | B2 | C1 | — | 1 | 25 | 25 | — | A2 | T1 = T2 | Incompatible |
| Example 18 | A2 | B2 | C2 | — | 15 | 5 | 0.33 | — | A2 | T1 = T2 | Incompatible |
| Example 19 | A2 | B2 | C2 | — | 10 | 5 | 0.5 | — | A2 | T1 = T2 | Incompatible |
| Example 20 | A2 | B2 | C2 | — | 5 | 5 | 1 | — | A2 | T1 = T2 | Incompatible |
| Example 21 | A2 | B2 | C2 | — | 10 | 10 | 1 | — | A2 | T1 = T2 | Incompatible |

TABLE 1-continued

| | Liquid-repellent layer | | | | Component content in liquid-repellent layer | | | | Comparison of Second resin layer | melting point of resin | Compatibility between component (A) and component (B) in liquid-repellent layer |
|---|---|---|---|---|---|---|---|---|---|---|---|
| | Component (A) | Component (B) | Component (C) | Component (D) | Component (B) [mass %] | Component (C) [mass %] | Mass ratio (C)/(B) | Component (D) [mass %] | Second resin layer | melting point of resin | |
| Example 22 | A2 | B2 | C2 | — | 5 | 10 | 2 | — | A2 | T1 = T2 | Incompatible |
| Example 23 | A2 | B2 | C2 | — | 5 | 15 | 3 | — | A2 | T1 = T2 | Incompatible |
| Example 24 | A2 | B2 | C1 | — | 5 | 5 | 1 | — | A2 | T1 = T2 | Incompatible |
| Example 25 | A2 | B2 | C1 | D1 | 5 | 5 | 1 | 5 | A2 | T1 = T2 | Incompatible |
| Example 26 | A2 | B2 | C1 | — | 10 | 10 | 1 | — | A2 | T1 = T2 | Incompatible |
| Example 27 | A2 | B2 | C1 | — | 5 | 10 | 2 | — | A2 | T1 = T2 | Incompatible |
| Example 28 | A2 | B2 | C1 | — | 7.5 | 15 | 2 | — | A2 | T1 = T2 | Incompatible |
| Example 29 | A2 | B2 | C1 | — | 10 | 20 | 2 | — | A2 | T1 = T2 | Incompatible |
| Example 30 | A2 | B2 | C1 | — | 15 | 30 | 2 | — | A2 | T1 = T2 | Incompatible |
| Example 31 | A2 | B2 | C1 | — | 10 | 30 | 3 | — | A2 | T1 = T2 | Incompatible |
| Example 32 | A2 | B2 | C1 | — | 1 | 15 | 15 | — | A2 | T1 = T2 | Incompatible |
| Example 33 | A3 | B2 | C1 | — | 5 | 10 | 2 | — | A3 | T1 = T2 | Incompatible |

TABLE 2

| | Liquid-repellent layer | | | | Component content in liquid-repellent layer | | | | Comparison of Second resin layer | melting point of resin | Compatibility between component (A) and component (B) in liquid-repellent layer |
|---|---|---|---|---|---|---|---|---|---|---|---|
| | Component (A) | Component (B) | Component (C) | Component (D) | Component (B) [mass %] | Component (C) [mass %] | Mass ratio (C)/(B) | Component (D) [mass %] | Second resin layer | melting point of resin | |
| Example 34 | A1 | B3 | C2 | — | 10 | 5 | 0.5 | — | A4 | T1 < T2 | Incompatible |
| Example 35 | A1 | B3 | C2 | — | 5 | 5 | 1 | — | A4 | T1 < T2 | Incompatible |
| Example 36 | A1 | B3 | C2 | — | 5 | 10 | 2 | — | A4 | T1 < T2 | Incompatible |
| Example 37 | A1 | B3 | C1 | — | 10 | 10 | 1 | — | A4 | T1 < T2 | Incompatible |
| Example 38 | A1 | B3 | C1 | — | 7.5 | 15 | 2 | — | A4 | T1 < T2 | Incompatible |
| Example 39 | A1 | B3 | C1 | — | 5 | 15 | 3 | — | A4 | T1 < T2 | Incompatible |
| Example 40 | A1 | B3 | C1 | — | 3 | 30 | 10 | — | A4 | T1 < T2 | Incompatible |
| Example 41 | A2 | B1 | C1 | — | 10 | 5 | 0.5 | — | A3 | T1 < T2 | Incompatible |
| Example 42 | A2 | B1 | C1 | — | 5 | 5 | 1 | — | A3 | T1 < T2 | Incompatible |
| Example 43 | A2 | B1 | C1 | — | 10 | 10 | 1 | — | A3 | T1 < T2 | Incompatible |
| Example 44 | A2 | B1 | C2 | — | 5 | 10 | 2 | — | A3 | T1 < T2 | Incompatible |
| Example 45 | A2 | B1 | C2 | — | 7.5 | 15 | 2 | — | A3 | T1 < T2 | Incompatible |
| Example 46 | A2 | B1 | C2 | — | 5 | 15 | 3 | — | A3 | T1 < T2 | Incompatible |
| Example 47 | A2 | B2 | C1 | — | 15 | 1 | 0.07 | — | A3 | T1 < T2 | Incompatible |
| Example 48 | A2 | B2 | C1 | — | 10 | 1 | 0.1 | — | A3 | T1 < T2 | Incompatible |
| Example 49 | A2 | B2 | C1 | — | 5 | 1 | 0.2 | — | A3 | T1 < T2 | Incompatible |
| Example 50 | A2 | B2 | C1 | — | 15 | 5 | 0.33 | — | A3 | T1 < T2 | Incompatible |
| Example 51 | A2 | B2 | C1 | — | 10 | 5 | 0.5 | — | A3 | T1 < T2 | Incompatible |
| Example 52 | A2 | B2 | C1 | — | 15 | 10 | 0.67 | — | A3 | T1 < T2 | Incompatible |
| Example 53 | A2 | B2 | C1 | — | 5 | 5 | 1 | — | A3 | T1 < T2 | Incompatible |
| Example 54 | A2 | B2 | C1 | — | 10 | 10 | 1 | — | A3 | T1 < T2 | Incompatible |
| Example 55 | A2 | B2 | C1 | — | 5 | 10 | 2 | — | A3 | T1 < T2 | Incompatible |
| Example 56 | A2 | B2 | C1 | — | 5 | 30 | 6 | — | A3 | T1 < T2 | Incompatible |
| Comparative Example 1 | A1 | — | — | — | — | — | — | — | A1 | T1 = T2 | — |
| Comparative Example 2 | A2 | — | — | — | — | — | — | — | A2 | T1 = T2 | — |
| Comparative Example 3 | A2 | B2 | — | — | 5 | — | — | — | A2 | T1 = T2 | Incompatible |
| Comparative Example 4 | A2 | B2 | — | — | 15 | — | — | — | A2 | T1 = T2 | Incompatible |
| Comparative Example 5 | A2 | — | C1 | — | — | 5 | — | — | A2 | T1 = T2 | — |

TABLE 3

| | Liquid repellency | | | | | | | | |
|---|---|---|---|---|---|---|---|---|---|
| | Without heat treatment | | | Warming in hot water | | | Retort treatment | | |
| | Amount of residual liquid [%] | Evaluation of residual liquid | Appearance | Amount of residual liquid [%] | Evaluation of residual liquid | Appearance | Amount of residual liquid [%] | Evaluation of residual liquid | Appearance |
| Example 1 | 3.4 | △ | △ | — | — | — | — | — | — |
| Example 2 | 3.0 | △ | △ | — | — | — | — | — | — |
| Example 3 | 2.5 | △ | △ | — | — | — | — | — | — |
| Example 4 | 2.8 | △ | △ | — | — | — | — | — | — |
| Example 5 | 2.3 | ○ | ○ | — | — | — | — | — | — |
| Example 6 | 1.9 | ◎ | ○ | — | — | — | — | — | — |
| Example 7 | — | — | — | 10.8 | △ | △ | 10.7 | △ | △ |
| Example 8 | — | — | — | 9.5 | ○ | △ | 9.5 | ○ | △ |
| Example 9 | — | — | — | 11.0 | △ | △ | 11.1 | △ | △ |
| Example 10 | — | — | — | 9.8 | ○ | △ | 9.7 | ○ | △ |
| Example 11 | 2.0 | ○ | ○ | — | — | — | — | — | — |
| Example 12 | — | — | — | 10.0 | △ | △ | 9.9 | ○ | △ |
| Example 13 | — | — | — | 10.6 | △ | △ | 10.6 | △ | △ |
| Example 14 | 2.4 | ○ | ○ | — | — | — | — | — | — |
| Example 15 | 2.1 | ○ | ○ | — | — | — | — | — | — |
| Example 16 | — | — | — | 11.1 | △ | △ | 11.3 | △ | △ |
| Example 17 | — | — | — | 12.8 | △ | △ | 12.9 | △ | △ |
| Example 18 | — | — | — | 7.8 | ◎ | ○ | 7.9 | ◎ | ○ |
| Example 19 | — | — | — | 7.8 | ◎ | ○ | 8.1 | ○ | ○ |
| Example 20 | — | — | — | 7.7 | ◎ | ○ | 8.0 | ○ | ○ |
| Example 21 | — | — | — | 8.3 | ○ | ○ | 8.4 | ○ | ○ |
| Example 22 | — | — | — | 7.9 | ◎ | ○ | 8.0 | ○ | ○ |
| Example 23 | — | — | — | 8.0 | ○ | ○ | 8.2 | ○ | ○ |
| Example 24 | — | — | — | 9.5 | ○ | △ | 9.9 | ○ | △ |
| Example 25 | — | — | — | 8.7 | ○ | △ | 8.8 | ○ | ○ |
| Example 26 | — | — | — | 9.1 | ○ | △ | 9.4 | ○ | △ |
| Example 27 | — | — | — | 9.0 | ○ | △ | 9.2 | ○ | △ |
| Example 28 | — | — | — | 8.8 | ○ | △ | 9.0 | ○ | △ |
| Example 29 | — | — | — | 8.2 | ○ | ○ | 8.5 | ○ | ○ |
| Example 30 | — | — | — | 7.9 | ◎ | ○ | 8.0 | ○ | ○ |
| Example 31 | — | — | — | 7.5 | ◎ | ○ | 7.8 | ◎ | ○ |
| Example 32 | — | — | — | 9.8 | ○ | △ | 10.2 | △ | ○ |
| Example 33 | — | — | — | 9.5 | ○ | △ | 9.6 | ○ | △ |

TABLE 4

| | Liquid repellency | | | | | | | | |
|---|---|---|---|---|---|---|---|---|---|
| | Without heat treatment | | | Warming in hot water | | | Retort treatment | | |
| | Amount of residual liquid [%] | Evaluation of residual liquid | Appearance | Amount of residual liquid [%] | Evaluation of residual liquid | Appearance | Amount of residual liquid [%] | Evaluation of residual liquid | Appearance |
| Example 34 | 2.7 | △ | △ | — | — | — | — | — | — |
| Example 35 | 2.5 | △ | △ | — | — | — | — | — | — |
| Example 36 | 2.2 | ○ | ○ | — | — | — | — | — | — |
| Example 37 | 2.4 | ○ | ○ | — | — | — | — | — | — |
| Example 38 | 2.5 | △ | △ | — | — | — | — | — | — |
| Example 39 | 2.3 | ○ | ○ | — | — | — | — | — | — |
| Example 40 | 2.6 | △ | △ | — | — | — | — | — | — |
| Example 41 | — | — | — | 7.9 | ◎ | ○ | 7.5 | ◎ | ○ |
| Example 42 | — | — | — | 7.2 | ◎ | ○ | 7.0 | ◎ | ○ |
| Example 43 | — | — | — | 7.8 | ◎ | ○ | 7.3 | ◎ | ○ |
| Example 44 | — | — | — | 7.7 | ◎ | ○ | 7.4 | ◎ | ○ |
| Example 45 | — | — | — | 7.4 | ◎ | ○ | 7.1 | ◎ | ○ |
| Example 46 | — | — | — | 7.4 | ◎ | ○ | 7.2 | ◎ | ○ |
| Example 47 | — | — | — | 7.4 | ◎ | ○ | 6.9 | ◎ | ○ |
| Example 48 | — | — | — | 6.1 | ◎ | ○ | 5.7 | ◎ | ○ |
| Example 49 | — | — | — | 6.1 | ◎ | ○ | 5.9 | ◎ | ○ |
| Example 50 | — | — | — | 6.9 | ◎ | ○ | 6.5 | ◎ | ○ |
| Example 51 | — | — | — | 7.7 | ◎ | ○ | 7.2 | ◎ | ○ |
| Example 52 | — | — | — | 6.9 | ◎ | ○ | 6.4 | ◎ | ○ |
| Example 53 | — | — | — | 6.8 | ◎ | ○ | 6.0 | ◎ | ○ |
| Example 54 | — | — | — | 7.5 | ◎ | ○ | 7.0 | ◎ | ○ |
| Example 55 | — | — | — | 7.4 | ◎ | ○ | 6.9 | ◎ | ○ |
| Example 56 | — | — | — | 7.8 | ◎ | ○ | 7.4 | ◎ | ○ |
| Comparative | 4.2 | X | X | — | — | — | — | — | — |

TABLE 4-continued

| | Liquid repellency | | | | | | | | |
|---|---|---|---|---|---|---|---|---|---|
| | Without heat treatment | | | Warming in hot water | | | Retort treatment | | |
| | Amount of residual liquid [%] | Evaluation of residual liquid | Appearance | Amount of residual liquid [%] | Evaluation of residual liquid | Appearance | Amount of residual liquid [%] | Evaluation of residual liquid | Appearance |
| Example 1 | | | | | | | | | |
| Comparative Example 2 | — | — | — | 18.4 | X | X | 17.5 | X | X |
| Comparative Example 3 | — | — | — | 13.0 | X | Δ | 12.8 | Δ | Δ |
| Comparative Example 4 | — | — | — | 13.5 | X | Δ | 13.0 | X | Δ |
| Comparative Example 5 | — | — | — | 15.0 | X | X | 14.5 | X | X |

As clearly shown in the results described in Table 3 and Table 4, it has been confirmed that according to the liquid-repellent laminates in Examples 1 to 56, the liquid repellency can be more improved in comparison with the liquid-repellent laminates in Comparative Examples 1 to 5.

Also, it has been found that the liquid-repellent laminates in Examples 41 to 56 allow the melting point T1 of the resin in the liquid-repellent layer and the melting point T2 of the resin in the second resin layer to satisfy a relation: T1<T2, so that particularly excellent liquid repellency can be obtained.

Incidentally, the liquid-repellent laminate in Example 16 having a low mass ratio of Component (C)/Component (B) of 0.02 and the liquid-repellent laminate in Example 17 having a high mass ratio of Component (C)/Component (B) of 25 had slightly lower liquid repellency result in comparison with liquid-repellent laminates in other Examples having a mass ratio of Component (C)/Component (B) in the range of 0.05 to 20. It has been confirmed, however, that the liquid-repellent laminates in Examples 16 and 17 are capable of more improving the liquid repellency in comparison with the liquid-repellent laminates in Comparative Examples.

REFERENCE SIGNS LIST 1, 2: LIQUID-REPELLENT LAMINATE, 11: LIQUID-REPELLENT LAYER, 12: SECOND RESIN LAYER, 13: ADHESIVE, 14: BASE MATERIAL, 51: SEAL PART, 52: SALAD OIL, 53: CORNER PART, 54: OIL DISPERSED IN WATER-TYPE LIQUID, 56: CONTAINER, 57: SCALE, 100, 200: SAMPLE FOR EVALUATION OF LIQUID-REPELLENT LAMINATE

The invention claimed is:

1. A liquid-repellent layer forming resin composition comprising:
   a polyolefin resin (A);
   a silylated polyolefin (B); and
   a compatibilizer (C) having a site compatible with the polyolefin resin (A) and a site compatible with the silylated polyolefin (B),
   wherein,
      a polyolefin site of the silylated polyolefin (B) is incompatible with the polyolefin resin (A),
      a mass ratio of a content of the compatibilizer (C) to a content of the silylated polyolefin (B), (Mass of compatibilizer (C)/Mass of silylated polyolefin (B)), is 0.05 to 20, and
      relative to a total solid content of the liquid-repellent layer forming resin composition,
         a content of the polyolefin resin (A) is 50.0-99.9 mass %, and
         a total content of the silylated polyolefin (B) and the compatibilizer (C) is 0.1-50.0 mass %.

2. The resin composition according to claim 1, wherein the compatibilizer (C) comprises at least one selected from a group consisting of a block copolymer of propylene and ethylene and a block copolymer of ethylene and an ethylene-butylene copolymer.

3. The resin composition according to claim 1, further comprising a silicone (D).

4. A liquid-repellent film comprising a liquid-repellent layer formed by using the resin composition according to claim 1.

5. The liquid-repellent film according to claim 4, further comprising one or more resin layers disposed on one main surface of the liquid-repellent layer.

6. The liquid-repellent film according to claim 5, wherein a melting point T1 (° C.) of the polyolefin resin (A) in the liquid-repellent layer and a melting point T2 (C) of a resin contained in a resin layer in contact with the liquid-repellent layer among the one or more resin layers satisfy a relation: T1<T2.

7. A liquid-repellent laminate comprising:
   a base material; and
   the liquid-repellent film according to claim 4 disposed on the base material,
      wherein the liquid-repellent layer is disposed on at least one outermost surface.

8. A packaging material formed by using the liquid-repellent laminate according to claim 7.

9. The packaging material according to claim 8 for use involving being subjected to heat treatment at 80° C. or more.

10. A container comprising a liquid-repellent layer formed by using the resin composition according to claim 1 at least on an inner surface.

* * * * *

UNITED STATES PATENT AND TRADEMARK OFFICE
CERTIFICATE OF CORRECTION

| | |
|---|---|
| PATENT NO. | : 12,065,557 B2 |
| APPLICATION NO. | : 16/973679 |
| DATED | : August 20, 2024 |
| INVENTOR(S) | : Aki Nagai et al. |

It is certified that error appears in the above-identified patent and that said Letters Patent is hereby corrected as shown below:

On the Title Page

Item (56) (Other Publications), Column 2, Line 2, delete "198206070" and insert --19820607.0--.

In the Specification

Column 1, Line 13, delete "2018-" and insert --2018-113861--.

In the Claims

Column 24, Line 44, In Claim 6, delete "(C)" and insert --(° C.)--.

Signed and Sealed this
Twelfth Day of November, 2024

Katherine Kelly Vidal
*Director of the United States Patent and Trademark Office*